United States Patent [19]

Nishimura

[11] Patent Number: 5,226,760
[45] Date of Patent: Jul. 13, 1993

[54] CUTTING TOOL WITH TWISTED EDGE AND MANUFACTURING METHOD THEREOF

[75] Inventor: Takayuki Nishimura, Nara, Japan

[73] Assignee: GN Tool Co., Ltd., Nara, Japan

[21] Appl. No.: 880,482

[22] Filed: May 6, 1992

Related U.S. Application Data

[63] Continuation of Ser. No. 561,052, Aug. 1, 1990, abandoned, which is a continuation-in-part of Ser. No. 548,128, Jul. 5, 1990, abandoned.

[30] Foreign Application Priority Data

Feb. 7, 1990 [JP] Japan ................................ 2-27963

[51] Int. Cl.⁵ .............................................. B23B 51/02
[52] U.S. Cl. ......................................... 407/54; 407/59; 407/63; 407/118; 76/108.6; 408/144
[58] Field of Search ............................. 407/53–54, 407/59, 63, 118–119, 32; 408/144, 145; 76/108.1, 108.6, DIG. 11, DIG. 12

[56] References Cited

U.S. PATENT DOCUMENTS

| 3,514,828 | 6/1970 | Wale | 408/144 X |
| 4,635,407 | 1/1987 | Pacini | 407/59 |
| 4,713,286 | 12/1987 | Bunting et al. | 51/307 X |
| 4,762,445 | 8/1988 | Bunting et al. | 408/144 |
| 4,934,881 | 6/1990 | Tsujimura et al. | 407/118 |
| 4,936,361 | 6/1990 | Mercier | 407/59 |
| 4,988,241 | 1/1991 | Colligan | 407/59 |
| 4,991,467 | 2/1991 | Packer | 76/DIG. 11 X |
| 4,997,049 | 3/1991 | Tank | 407/118 |
| 5,011,515 | 4/1991 | Frushour | 407/118 |
| 5,020,394 | 6/1991 | Nakamura et al. | 407/119 X |
| 5,031,484 | 7/1991 | Packer | 407/118 X |
| 5,070,748 | 12/1991 | Packer | 407/119 X |
| 5,115,697 | 5/1992 | Rodriguez et al. | 407/119 X |

FOREIGN PATENT DOCUMENTS

| 2276892 | 7/1974 | France | 407/118 |
| 0010707 | 1/1991 | Japan | 408/144 |
| 1526921 | 12/1989 | U.S.S.R. | 407/118 |
| 2016336 | 9/1979 | United Kingdom | 407/63 |

Primary Examiner—Bruce M. Kisliuk
Assistant Examiner—John A. Marlott
Attorney, Agent, or Firm—Koda and Androlia

[57] ABSTRACT

The invention relates to a cutting tool having twisted edge in a blade part, having a sintered compact with higher hardness and higher wear resistance than a base sintered body buried and affixed along the twisted edge, and its manufacturing method. The blade part of the cutting tool comprises the base sintered body having a twisted groove in the position of forming the twisted edge on the outer circumference, and the sintered compact of high harndess and high wear resistance applied and buried in the twisted groove and affixed to the base sintered body by sintering, and the twisted edge is formed on the sintered compact of high hardness and high wear resistance. Its manufacturing method comprises a step of forming a presintered or a sintered base material of the blade part with material powder, a step of forming a twisted groove on the outer circumferenced of the base material, a step of filling the twisted groove with material powder of sinter of high hardness and high wear resistance, a step of heating and pressurizing the base material with the material powder, and sintering and affixing the material powder to the base material, and a step of machining thus sintered and united base material to form a twisted edge on the sintered compact of high hardness and high wear resistance.

6 Claims, 4 Drawing Sheets

CUTTING TOOL WITH TWISTED EDGE AND MANUFACTURING METHOD THEREOF

This is a continuation of application Ser. No. 561,052, filed Aug. 1, 1990, now abandoned, which is a continuation-in-part of application Ser. No. 548,128, filed Jul. 5, 1990, now abandoned.

BACKGROUND OF THE INVENTION

1. Field of the Invention

The present invention relates to an improvement of cutting tool such as end mill and reamer having a twisted edge in the blade part, and more particularly to a cutting tool comprising a sintered compact of high hardness and high wear resistance buried and affixed in the blade part along the twisted edge, the sintered compact, such as polycrystalline diamond sinter and cubic boron nitride sinter, being higher in hardness and wear-resistance than its base material, and the manufacturing method of the cutting tool.

2. Description of the Prior Art

Hitherto, in order to meet the demands for enhancing cutting efficiency and prolonging tool life, cutting tools such as end mill and reamer having a sintered compact of diamond or cubic boron nitride in the blade part, the sintered compact being very high in hardness and excellent in wear resistance, have been developed and employed.

The sintered compact of high hardness and high wear resistance used in such conventional cutting tools is in a chip form shaped by sintering fine powder of diamond or cubic boron nitride at high temperature and high pressure. Besides, to facilitate bonding to the base material of the blade part such as cemented carbide and steel, the material powder of diamond or cubic boron nitride is not sintered alone, but it is sintered and formed on a substrate made of cemented carbide or the like. Thus formed sintered chip is about 0.5 mm in thickness, and is shaped in circular, semicircular, sector, triangular, rectangular or other thin plate form, and this sintered chip is soldered to be buried and affixed in part of the base material of the blade part.

Examples of such conventional cutting tools are shown in FIG. 6 and FIG. 7.

A straight edge end mill 1 in FIG. 6 comprises a blade 2 and a shank 3, and the blade 2 made of cemented carbide, steel or the like is provided with a front edge 4a and a side straight edge 4b. In the blade 2, moreover, two sintered chips 5 of high hardness and high wear resistance in semicircular plate form are buried and affixed by soldering so as to form part of the edges 4a, 4b at positions where much load is applied while machining, in particular.

A straight edge end mill 1a shown in FIG. 7 is formed exactly the same, in which two bar-shaped sintered chips 5 of high hardness and high wear resistance are buried and affixed so as to form part of the front edge 4a and the side straight edge 4b.

Such structure is quite the same in other cutting tools.

Thus, in all conventional cutting tools, a high hardness sintered chip such as diamond sinter and cubic boron nitride sinter is buried and affixed so as to form part of the straight edge, and the other part of this straight edge is made of its base material itself.

Besides, such cutting tools composed of the sintered chips of high hardness and high were resistance buried therein are almost limited to straight edge type, and can not have twisted edge such as end mill and reamer. This is because such a sintered chip is formed by sintering material particles at high temperature and superhigh pressure, and as a matter of course thus formed sintered chip is limited in its shape and size, and can not be in a twisted shape or be buried to form part of the twisted edge.

Moreover, when burying and affixing the sintered chip of diamond or cubic boron nitride to the base material of the blade by soldering, the chip is heated to a considerably high temperature, and the adverse effect by the heat cannot be ignored. In particular, in the case of a diamond sintered chip, heating may cause to form a graphite layer on the sintered chip surface and to burn the chip, so a sufficient caution is needed during work.

Yet, whether in diamond or in cubic boron nitride, soldering of the sintered chip and the base material may be peeled off by the heat during the process of machining.

On the other hand, cutting tools having a twisted edge on the flank of the blade part, for example, spiral end mills, are known to be more excellent in the cutting performance and the dimensional precision after cutting than the straight edge end mills.

SUMMARY OF THE INVENTION

It is hence a primary object of the invention to present a cutting tool and its manufacturing method characterized by a sintered compact of diamond, cubic boron nitride and the like buried and affixed along its twisted edge, the sintered compact being higher in hardness and wear resistance than the base material of the blade part, and also characterized by excellent cutting performance, cutting efficiency, dimentional precision after cutting and long life thereof.

It is other object of the invention to present a cutting tool and its manufacturing method wherein the sintered compact of high hardness and high wear resistance of diamond and the like may be easily and securely buried and affixed to the base material and free from risk of peeling of the sintered compact during machining.

To achieve the above objects, the invention presents a cutting tool possessing a twisted edge in the blade part, wherein the blade part comprises a base sintered body having a twisted groove in the position of forming the twisted edge on the outer circumference, and a sintered compact of high hardness and high wear resistance, higher in hardness and wear resistance than the base sintered body, being applied and buried in the twisted groove and affixed to the base sintered body by sintering, and the twisted edge is formed on the sintered compact of high hardness and high wear resistance.

The sintered compact of high hardness and high wear resistance is preferably formed of polycrystalline diamond sinter or cubic boron nitride sinter, and the base material of the blade part is preferably made of cemented carbide.

The manufacturing method of the cutting tool of the present invention having a twisted edge in the blade part comprises:

a first step of forming a presintered base material of the blade part by presintering material powder, a second step of forming a twisted groove on the outer circumference of the presintered base material in which the twisted edge is to be formed, a third step of filling the twisted groove with material powder of sinter of high hardness and high wear resistance and higher in hardness and wear-resistance than the base material after complete sintering, a fourth step of heating and pressurizing the presintered base material having the twisted groove filled with the material powder of sinter of high hardness and high wear resistance, thereby completely sintering the presintered base material to form a base sintered body, and also sintering the material powder of sinter of high hardness and high wear resistance to form a sintered compact and affix the sintered compact to the base sintered body, and a fifth step of processing the base sintered body to which the sintered compact of high hardness and high wear resistance is affixed, and forming the twisted edge in the sintered compact of high hardness and high wear resistance.

And another method thereof comprises:

a first step of forming a base sintered body of the blade part by sintering material powder, a second step of forming a twisted groove on the outer circumference of the base sintered body in which the twisted edge is to be formed, a third step of filling the twisted groove with material powder of sinter of high hardness and high wear resistance and higher in hardness and wear-resistance than the base sintered body after sintering, a fourth step of heating and pressurizing the base sintered body having the twisted groove filled with the material powder of sinter of high hardness and high wear resistance, thereby sintering the material powder of sinter of high hardness and high wear resistance to form a sintered compact and affix the sintered compact to the base sintered body, and a fifth step of processing the base sintered body to which the sintered compact of high hardness and high wear resistance is affixed, and forming the twisted edge in the sintered compact of high hardness and high wear resistance.

Before the fifth step it may be also possible to include a step of bonding a shank member to one end of the base sinter body to which the sintered compact of high hardness and high wear resistance has been affixed.

Meanwhile, the fifth step should preferably include a step of machining a twisted flute by grinding the outer circumference of the base sintered body, and a step of machining the twisted edge by discharge cutting or electrolytic polishing of the sintered compact of high hardness and high wear resistance.

As a result of constructing in this way, the base material of the blade part is formed of a sinter, and the material of high hardness and high wear resistance, being buried in the twisted groove formed on the outer circumference of the base material and being higher in hardness and wear resistance than the base material, or the base sinter body, is also formed of a sinter. Besides, the base sintered body and the sintered compact of high hardness and high wear resistance are affixed to each other by sintering, so that both of them are bonded at very high strength. Therefore, risk of peeling of the sintered compact of high hardness and high wear resistance from the base sintered body during machining will be eliminated.

Moreover, since the twisted edge is formed on the sintered compact of high hardness and high wear resistance buried in the twisted groove of the base sintered body, the cutting performance, cutting efficiency and dimensional precision after cutting are superior to those of the cutting tool having a straight edge, and the tool life is very long at the same time.

Still more, since the sintered compact of high hardness and high wear resistance is buried in the twisted groove formed on the outer circumference of the base sintered body and is affixed with the base sintered body by sintering, the sintered compact of high hardness and high wear resistance may be buried and affixed in the base sintered body easily and securely.

DETAILED DESCRIPTION OF THE INVENTION

Reffering now to the drawings, one of the embodiments of the invention is described in detail below.

Figure 1:
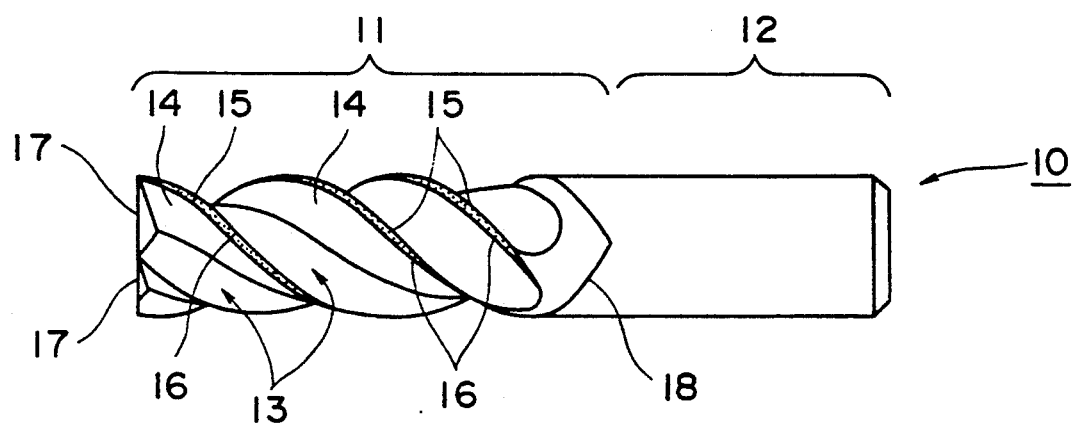
FIG. 1 and FIG. 2 relate to an embodiment of the invetion in a spiral end mill, FIG. 1 being a front view of the spiral end mill and FIG. 2 being a side view thereof as seen from the front end side.
Figure 2:
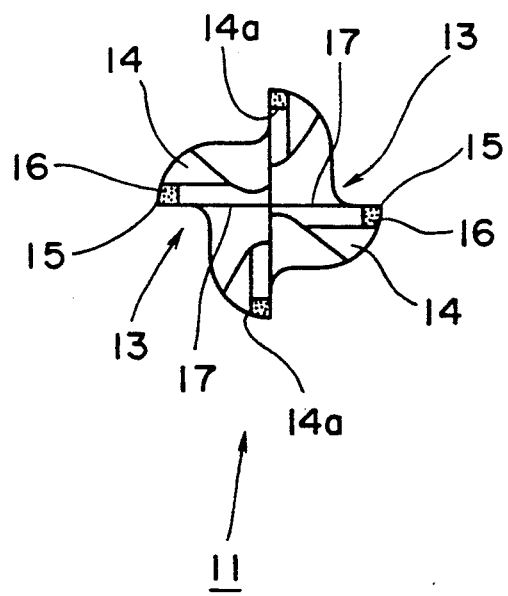

FIG. 1 and FIG. 2 relate to an embodiment of the invention applied to a spiral end mill.

The spiral end mill 10 comprises a cemented carbide blade part 11 possessing four spiral twisted edges 15 and four straight front edges 17, and a steel shank 12 bonded to the base part of the blade part 11. On the flank of the blade part 11 are provided four spiral twisted flutes 13 and lands 14, and the four twisted edges 15 are formed on and along each cutting side edge of the lands 14. The front edges 17 are formed at the front end of the blade part 11, and individually extend and connect to the twisted edges 15.

At the ends of the twisted edge 15 side of the land 14, individually, a spiral twisted groove 14a is formed along the twisted edge 15, and the twisted groove 14a is solidly filled with a sintered compact 16 of high hardness and high wear resistance, higher in hardness and wear resistance than the cemented carbide forming the base part of the blade part 11. The twisted edge 15 is formed on the sintered compact 16 of high hardness and high wear resistance.

As clear from the drawings, the twisted groove 14a reaches up to a front end surface of the blade part 11, and part of the sintered compact 16 of high hardness and high wear resistance is exposed on the front end surface. Accordingly, only the outer end portion of the front edge 17 is formed of the sintered compact 16 of high hardness and high wear resistance, and the other portion thereof is made of the cemented carbide of the base material.

As the sintered compact 16 of high hardness and high wear resistance, any known sinter may be used as far as it is higher in hardness and more excellent in ware resistance than the base sintered body, and in particular a sintered compact formed of powder of polycrystalline diamond or cubic boron nitride sintered at high temperature and superhigh temperature is preferable.

The sintered compact 16 of high hardness and high wear resistance is formed, in this embodiment, as a thin layer with a thickness (length in the radial direction) of about 0.5 mm. Also the twisted groove 14a is formed almost in the overall length of the twisted edge 15, and therefore the sintered compact 16 of high hardness and high wear resistance is also buried almost in the overall length of the twisted edge 15.

Since the sintered compact 16 of high hardness and high wear resistance is very expensive, in order to reduce its consumption, it may be formed only in the part near the front end of the twisted edge 15 or it may be also preferable to be buried as a thin layer in the area close to the twisted edge 15 of the land 14.

Numeral 18 is a junction of the blade part 11 and a shank 12.

Figure 3A:
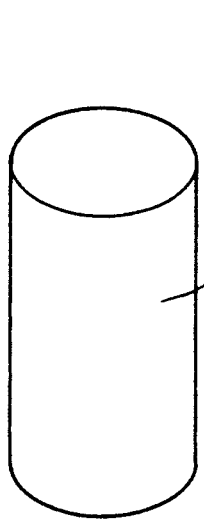
FIGS. 3(a), 3(b) and 3(c) presents explanatory drawings showing the manufacturing steps of the spiral end mill shown in FIG. 1 and FIG. 2, 3(a) being a perspective view of a presintered base material or a base sintered body, 3(b) a perspective view in a state of forming a twisted groove in the base material or the base sintered body of 3(a), and (c) a perspective view in a state of filling the twisted groove of the base material or the base sintered body with material powder of sinter of high hardness and high wear resistance.
Figure 3B:
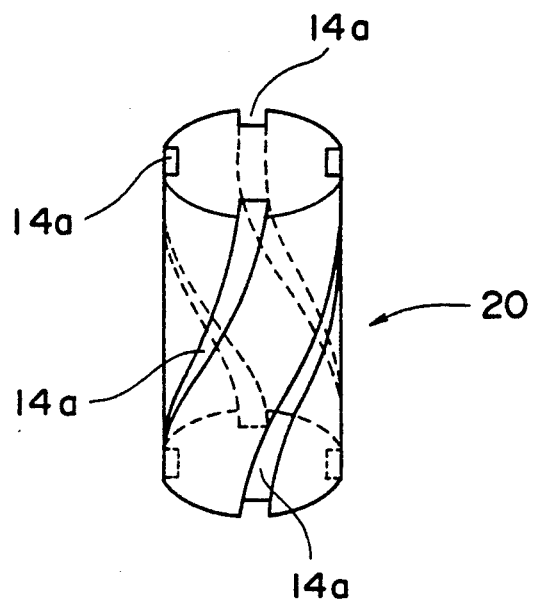
Figure 3C:
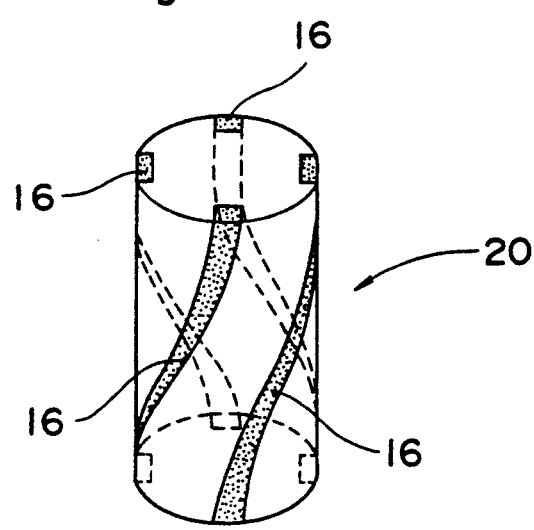
Figure 4:
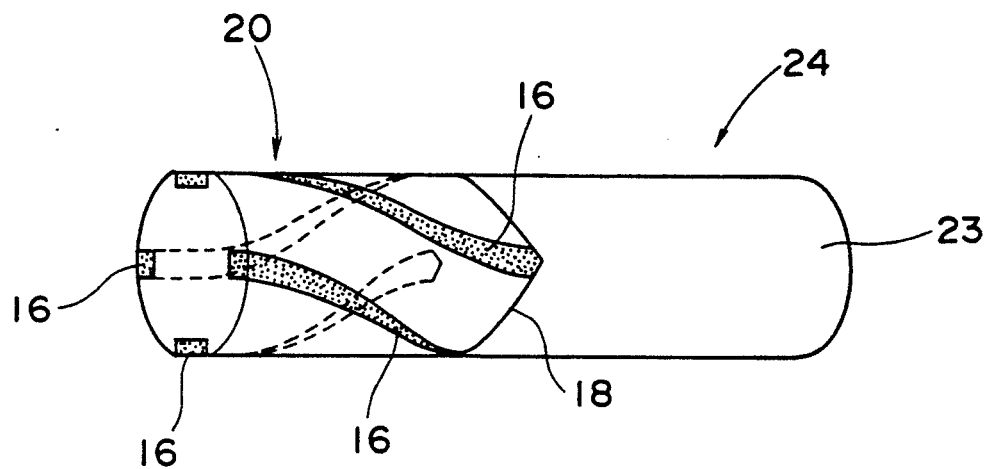
FIG. 4 is a perspective view of a semifinished product after bonding the base sintered body to a shank memeber, the base sintered body having its twisted groove filled with a sintered compact of high hardness and high wear resistance.
Figure 5:
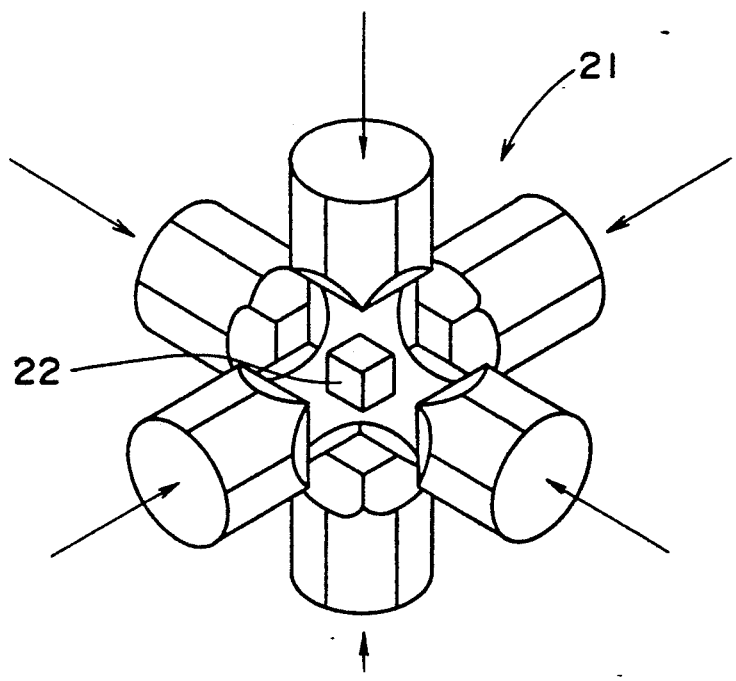
FIG. 5 is a schematic explanatory diagram of a three-axial direction pressurizing and heating apparatus used for sintering.
Figure 6:
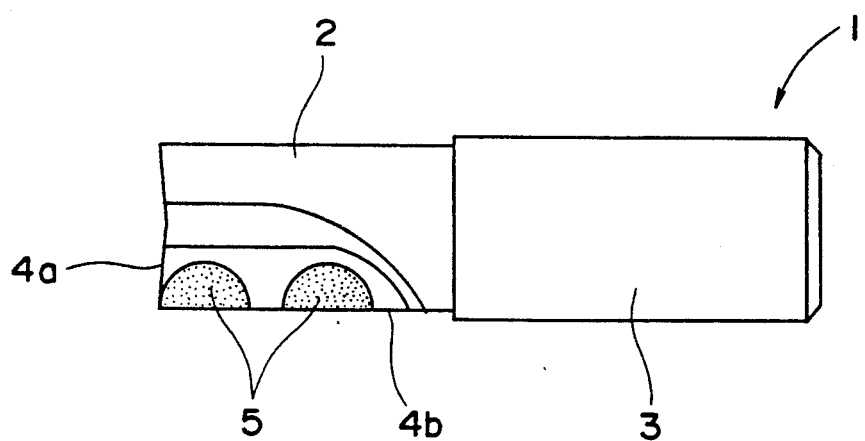
FIG. 6 and FIG. 7 are front views showing conventional straight edge end mills.
Figure 7:
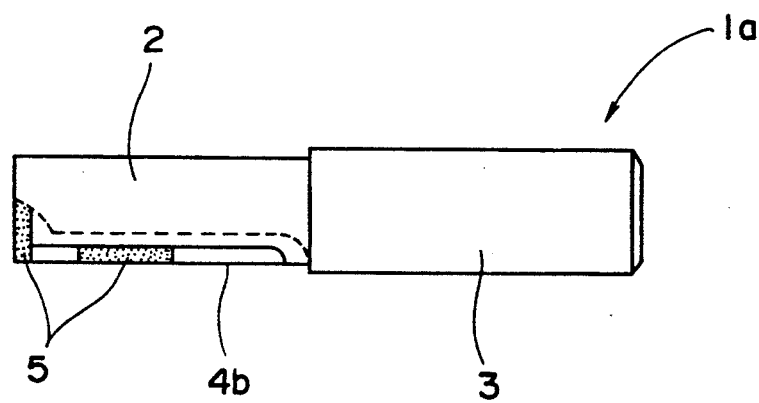

Referring next to FIG. 3 to FIG. 5, the manufacturing method of the spiral end mill 10 composed in this manner is described below.

First step

Material powder of cemented carbide to become the base material of the blade part 11 is presintered to form a columnar base material 20 as shown in FIG. 3(a).

Second step

Four-spiral twisted grooves 14a are formed on the outer surface of thus presintered base material 20. As a result, the shape of the presintered base material 20 becomes as shown in FIG. 3(b). The twisted grooves 14a are set at the positions where the twisted edges 15 are formed, corresponding to the number and lead of the twisted edges 15, and usually the width and depth of the twisted grooves are preferably both about 1 mm.

Third step

A proper sintering aid is mixed to material powder of polycrystalline diamond or cubic boron nitride to become the sintered compact 16 of high hardness and high wear resistance, and thus mixed powder is filled in the twisted grooves 14a of the presintered base material 20. As a result, the entire form becomes nearly a perfect cylindrical form.

Fourth step

In seccession, the presintered base material 20 having the twisted groove filled with the powder is put into a heating and pressurizing apparatus 21 shown in FIG. 5, and is heated and pressurized for at least three minutes under the conditions of pressure of about 45,000 atmospheres or more and temperature of about 1,400° to 1,600° C. Consequently, the presintered base material 20 is completely sintered to become a base sintered body, and the mixed material powder of sinter of high hardness and high wear resistance filled in the twisted grooves 14a is sintered to become sinter compacts 16 in the twisted grooves 14a. At the same time, the sintered compacts 16 of high hardness and high wear resistance are firmly affixed to the base sintered body 20 to be united in one body.

Thus is manufactured, as shown in FIG. 3(c), the columnar sintered body formed by burying and affixing the sintered compacts 16 of high hardness and high wear resistance in the twisted grooves 14a on the outer circumference of the base sintered body 20 made of cemented carbide. The columnar sintered body is used as the blade part 11 of the spiral end mill 10.

The heating and pressurizing apparatus 21 schematically shown in FIG. 5 is designed to heat a sintering object 22 such as the base material 20, and also to pressurize the sintering object 22 simultaneously in three directions of the X-, Y-, and Z-axes (or form six points by three sets of opposing pressurizing means). Therefore, different from the conventional apparatus capable of manufacturing only a flat sinter, a sinter of a solid shape as mentioned above may be also manufactured.

Fifth step

At one end of the base sintered body 20 of which twisted grooves 14a are filled solidly with the sintered compacts 16 of high hardness and high wear resistance, a shank member 23 is bonded by soldering, and then a semifinished product 24 of the spiral end mill 10 as shown in FIG. 4 is manufactured.

Sixth step

In succession, twisted flutes 13 and twisted edge 15 are processed on the outer surface of the base sintered body 20 of the semifinished product 24 shown in FIG. 4.

First, the semifinished product 24 is set in a grinder or the like, and four twisted flutes 13 and lands 14 are machined by grinding on the outer surface of the base sintered body 20 of the semifinished products 24 by using diamond wheel, so that a finishing allowance may be left over on each sinter 16 of high hardness and high wear resistance. Since the base sintered body 20 is made of cemented carbide, machining of the twisted flutes 13 and the lands 14 may be same as that of conventional cutting tools made of cemented carbide.

After completion of machining of twisted flutes 13 and lands 14, the sintered compacts 16 of high hardness and high wear resistance are finished precisely and accurately by discharge cutting, electrolytic polishing or the like, and twisted edges 15 and front edges 17 are formed, thereby the spiral end mill 10 shown in FIG. 1 and FIG. 2 is completed.

Using this spiral end mill 10, machining is preformed in the same manner as in the conventional spiral end mill, by means of the twisted edges 15 entirely formed of the sintered compacts 16 of high hardness and high wear resistance, and by means of the front edges 17 partially formed of the sintered compacts 16 of high hardness and high wear resistance.

In the foregoing embodiment, the material powder to become the base material is discribed as being presintered in the first step, however, it may be also completely sintered at this step.

Also, in the foregoing embodiment, only the spiral end mill is described, but, needless to say, the invention may be similarly applied to other cutting tools than the end mill as far as one has a twisted edge.

As described herein, the cutting tool of the invention is manufactured by forming twisted grooves on the outer circumference of the presintered or the sintered base material of the blade part, burying material powder of sinter of high hardness and high wear resistance in the twisted grooves, affixing the material powder to the base material by sintering, the material powder becoming a sintered compact higher in hardness and wear resistance than the sintered base material, or the base sintered body, and disposing twisted edges on the sintered compact of high hardness and high wear resistance. Therefore, as compared with the cutting tool having straight edges, the cutting tool of the present invention excels in the cutting performance, cutting efficiency and dimensional precision after cutting, and what is more, unlike the conventional cutting tool, there is no risk of peeling of the sinter compact due to heat during cutting operation, and a stable performance is exhibited for a long period, and the service life is very long.

Besides, in the manufacturing method of the cutting tool of the invention, after the twisted grooves formed on the outer circumference of the presintered base material being filled with material powder of sinter of high hardness and high wear resistance, the presintered base material is completed sintered to form a base sintered body, and at the same time the material powder of sinter of high hardness and high wear resistance is sintered to form a sintered compact and affixed to the base sintered body, so that burying and affixing of the sintered compact of high hardness and high wear resistance to the base sintered body may be executed easily and securely.

Also, the same effect will be brought about when the material powder of sinter of high hardness and high wear resistance is filled in the twisted grooves of the sintered base material, or the base sintered body, and then sintered to be affixed to the base sintered body.

What is claimed is:

1. A cutting tool having a spiral twisted cutting edge on the circumferential wall of its blade part wherein:
    said blade part comprises a sintered base body which has a spiral twisted groove on said circumferential wall where said twisted cutting edge is formed, and a high temperature and ultra high pressure sintered compact which is applied and buried in said spiral twisted groove and unified with said sintered base body by high temperature and ultra high pressure sintering,
    said high temperature and ultra high pressure sintered compact is a sintered body of high hardness and high wear resistance and higher in hardness and wear resistance than said sintered base body, and
    said spiral twisted cutting edge is formed on said high temperature and ultra high pressure sintered compact.

2. A cutting tool according to claim 1, wherein the sintered compact of high hardness and high wear resistance is polycrystalline diamond sinter or cubic boron nitride sinter.

3. A cutting tool according to claim 1, wherein the base sintered body is formed of cemented carbide.

4. A cutting tool according to claim 2, wherein the base sintered body is formed of cemented carbide.

5. A cutting tool according to claim 1 wherein said cutting tool is a spiral end mill.

6. A cutting tool according to claim 1, wherein the cutting tool is a cutting tool selected from the group consisting of end mills, reamers and router bits.

* * * * *